United States Patent
Boss et al.

(10) Patent No.: US 8,352,375 B2
(45) Date of Patent: *Jan. 8, 2013

(54) DIGITAL RIGHTS MANAGEMENT

(75) Inventors: Gregory J Boss, American Fork, UT (US); Peter G Finn, Brampton (CA); Rick A Hamilton, Charlottesville, VA (US); Timothy M Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/025,314

(22) Filed: Feb. 11, 2011

(65) Prior Publication Data

US 2011/0131634 A1    Jun. 2, 2011

Related U.S. Application Data

(63) Continuation of application No. 11/421,605, filed on Jun. 1, 2006, now Pat. No. 7,937,328.

(51) Int. Cl.
  *G06F 21/00*  (2006.01)
  *H04N 7/10*   (2006.01)
  *G06K 9/00*   (2006.01)

(52) U.S. Cl. ............... 705/59; 705/65; 705/75; 725/32; 382/100

(58) Field of Classification Search ............ 705/59; 725/32; 382/100
See application file for complete search history.

(56) References Cited

U.S. PATENT DOCUMENTS

| | | | |
|---|---|---|---|
| 5,862,260 A | 1/1999 | Rhoads | |
| 6,580,819 B1 | 6/2003 | Rhoads | |
| 6,751,320 B2 | 6/2004 | Rhoads | |
| 6,804,376 B2 | 10/2004 | Rhoads et al. | |
| 6,829,368 B2 | 12/2004 | Meyer et al. | |
| 7,171,390 B1 | 1/2007 | Song et al. | |
| 7,937,328 B2 * | 5/2011 | Hamilton et al. | 705/59 |
| 2003/0103645 A1 * | 6/2003 | Levy et al. | 382/100 |
| 2006/0271915 A1 | 11/2006 | Stefik et al. | |
| 2009/0158318 A1 * | 6/2009 | Levy | 725/32 |
| 2010/0212027 A1 * | 8/2010 | Stefik et al. | 726/29 |

OTHER PUBLICATIONS

David A Mims; Method for Digital Rights Management; Apr. 24, 2006; U.S. Appl. No. 11/421,605; USPTO.
Frank C Nicholas; Preliminary Amendment; Mar. 28, 2008; U.S. Appl. No. 11/421,605; USPTO.
Robert C Rolnik; Preliminary Amendment; Feb. 16, 2009; U.S. Appl. No. 11/421,605; USPTO.

(Continued)

*Primary Examiner* — Charles C Agwumezie
(74) *Attorney, Agent, or Firm* — Mark Vallone; Robert C. Rolnik

(57) ABSTRACT

A method for digital rights management includes receiving a selection input from a user, associating a customer number with a file based on the selection input, embedding the customer number and a file identifier associated with the file in the file, and sending the file with the embedded customer number and file identifier to the user. One embodiment includes receiving a customer number change request, revising the central database in response to the customer number change request, determining a new customer number responsive to the customer number change request, and embedding the determined new customer number in the file. Another embodiment includes receiving an authorization request associated with a file, determining an authorization based on the central database and authorization request, and sending an authorization notice response to the determined authorization.

9 Claims, 4 Drawing Sheets

OTHER PUBLICATIONS

Charles C Agwumezie; Office Action; Mar. 16, 2010; U.S. Appl. No. 11/421,605; USPTO.
Robert C Rolnik; Amendment to Office Action; May 11, 2010; U.S. Appl. No. 11/421,605; USPTO.
Charles C Agwumezie; Final Office Action; Jul. 14, 2010; U.S. Appl. No. 11/421,605; USPTO.
Robert C Rolnik; Appeal Brief; Sep. 3, 2010; U.S. Appl. No. 11/421,605; USPTO.
Charles C Agwumezie; Examiner Amendment; Dec. 15, 2010; U.S. Appl. No. 11/421,605; USPTO.
USPTO; Notice of Allowance; Dec. 28, 2010; U.S. Appl. No. 11/421,605.

* cited by examiner

100

200

300

400

DIGITAL RIGHTS MANAGEMENT

CROSS-REFERENCE TO RELATED APPLICATIONS

The present application is a continuation of U.S. application Ser. No. 11/421,605, filed Jun. 1, 2006, entitled "Digital Rights Management," which is assigned to the assignee of the present invention and incorporated herein by reference in its entirety.

FIELD OF INVENTION

The present invention generally relates to digital rights management. More specifically, the invention relates to methods for determining ownership of digital files.

BACKGROUND OF THE INVENTION

Copyright laws protect the creative works of authors, and restrict rights for limited periods of time. As more works take the form of computer files (i.e., in digital form), the act of copying has become easier. At the same time, the perfect nature of a digital copy does not provide a disincentive a user from using a copy.

Content providers attempt to overcome these difficulties with digital rights management. Digital rights management is a global term addressing techniques that protect a content provider's copyrights, while attempting to provide the user with the content in an appropriate fashion.

Typically, digital rights management techniques have attempted to prevent unauthorized copying with restrictions encoded in a file. Such techniques are generally sufficient to thwart the amateur, or unsophisticated, unauthorized copier, but most such techniques are at least susceptible to a hacking attack designed to break the restrictions. Few such techniques have proved successful for significant spans of time.

Thus, unauthorized copying is prevalent. However, proof of legitimate ownership is difficult to show in many instances, so the mere possession of a digital file can be seen as insufficient to prove ownership, since there is no way to tell if a particular instance of a file is authorized or unauthorized. For example, there is no way to determine if a particular instance of the file was "ripped" from a CD, or downloaded from a peer-to-peer network without authorization from the copyright holder.

Without the ability to prove ownership, prosecution of copyright infringers is implausible at best.

One prior solution to these problems is known as the DIVX® system. DIVX formatted products are distributed in a format only suitable for play on specially configured DIVX players. Upon playback of the file encoded on a DIVX medium, a play count for that medium is decremented. After the play count is decremented to zero, the DIVX media will no longer play on a DIVX player without securing additional "plays" or licenses from an issuer. However, the security features for DIVX are contained within the files, and therefore accessible to a hacking attack. A similar system, called Digital Video Express®, enabled rental of specially coded discs that did not require return. The Digital Video Express discs expired after a set, prepaid viewing period, such as 48 hours. Payment of an additional fee reauthorizes the Digital Video Express disc for another prepaid viewing period. However, like DIVX, Digital Video Express includes the protection in the file so that hackers have all the necessary information to crack the coding.

Another solution is a digital watermark encoded within a file. However, technology has arisen that allows copying of the digital watermark. Such copying reduces the value of the digital watermark.

It is therefore a challenge to develop a method to develop digital rights management strategies to overcome these, and other, disadvantages.

SUMMARY OF THE INVENTION

A first embodiment of the present invention is a method for digital rights management. The method includes receiving a selection input from a user, associating a customer number with a file based on the selection input, embedding the customer number and a file identifier associated with the file in the file, and sending the file with the embedded customer number and file identifier to the user.

A second embodiment of the present invention is a computer usable medium including computer readable code for digital rights management. The medium includes computer readable code for receiving a selection input from a user, computer readable code for associating a customer number with a file based on the selection input, computer readable code for embedding the customer number and a file identifier associated with the file in the file, and computer readable code for sending the file with the embedded customer number and file identifier to the user.

A third embodiment of the present invention is a system for digital rights management. The system includes means for receiving a selection input from a user, means for associating a customer number with a file based on the selection input, means for embedding the customer number and a file identifier associated with the file in the file, and means for sending the file with the embedded customer number and file identifier to the user.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
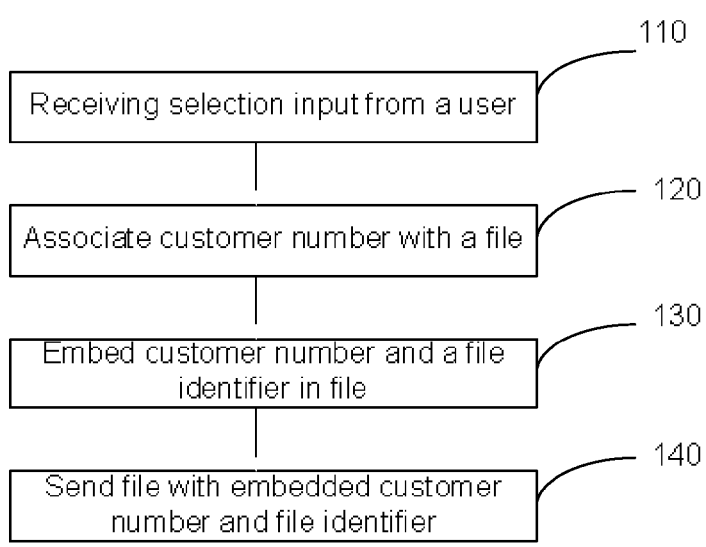
FIG. 1 illustrates one embodiment of a method for digital rights management in accordance with one aspect of the invention.

FIG. 1 illustrates one embodiment of a method 100 for digital rights management in accordance with one aspect of the invention. Any of the inventive methods disclosed herein may be performed in any order, and the order in which the method steps are described does not limit the order in which the steps can be performed.

Method 100 begins at step 110 by receiving a selection input from a user. The selection input is received at a central location from a user, such as over a network connection. The network connection can include an Internet connection, either wired or wireless. The central location includes a database stored on at least one computer device. The selection input is associated with at least one file stored in an appropriate storage medium at or in communication with the central location. The central location can be a point of sale, in one embodiment. Alternatively, the central location can be a rights clearinghouse.

For example, the central location distributes an offer of at least one file, such as an e-book, application, entertainment file (i.e. mp3, ogg, wma, jpeg, mpeg, etc.) to at least one user via the network connection. The offer, for example, is a web page illustrative of files stored at or in communication with the central location. Based on the offer, a remote user desires to receive at least one of the files, and the central location receives a selection input from the user, such that the selection input is associated with at least one file. The selection input need not be associated with any files actually offered or displayed to the user. The file is assigned a unique file identifier, and the unique file identifier is embedded into the file, such as with a watermark or steganographic encoding.

At step 120, a customer number is associated with the file associated with the selection input. The customer number is a unique identifier associated with the source of the selection input, such as an account number for the user that originated the selection input. The association, for example, is done via a database lookup. The file identifier can be considered a primary number and the customer number can be considered a secondary number.

After determining the file associated with the selection input, the customer number is embedded into the file at step 130. The customer number can be embedded into the file such as with a watermark or steganographic encoding. The file identifier can be embedded into the file prior to, or substantially concurrent with, the customer number. The file identifiers and customer numbers can be embedded into the file through the adoption of an ID TAG standard, such as with an enhancement to the ID3 tag standard. The identifiers can be placed in a header or footer of the file. It is preferred that the addition of the file identifier and customer number minimize any data degradation and that the additional information does not degrade the digital quality of the media.

At step 140, the file is sent to the user associated with the selection input, with the customer number and file identifier embedded into the file. The file can be sent using a network connection, or the file can be embedded into a storage media and distributed via mail or personal delivery to the user. Sending the file can be associated with receiving payment or other consideration from the user. Alternatively, the file transfer can be without a correlating transfer of value, in which case, method 100 serves to show that the transfer of the file is an authorized transfer such that the user is authorized to possess a copy of the file.

Additionally, the central location stored an association between the customer number and file identifier at a location in communication with the central location. Storing the association remote from the user provides a record of ownership.

Figure 2:
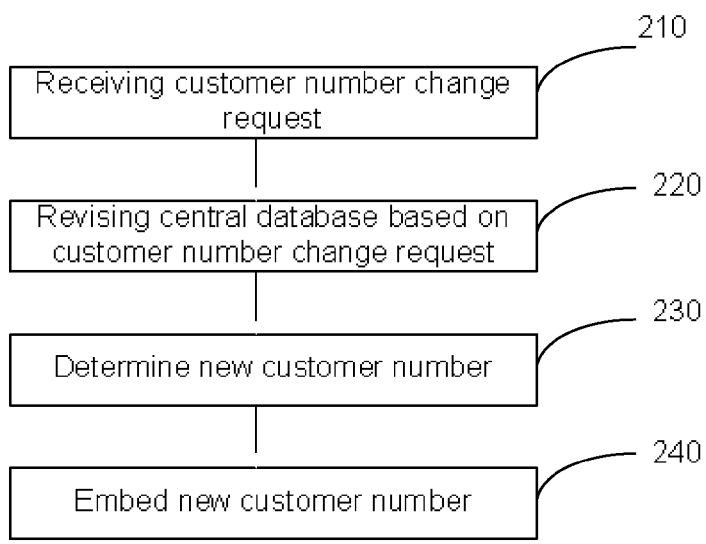
FIG. 2 illustrates another embodiment of a method for digital rights management in accordance with one aspect of the invention.

FIG. 2 illustrates one embodiment of a method 200 for digital rights management in accordance with one aspect of the invention. Method 200 begins at 210 by receiving a customer number change request. A customer number change request is a request, received via a network connection, to change or alter the customer number embedded in a file. The customer number change request is received at the central location and includes a file that includes an embedded customer number and file identifier, as well as a new customer number. The new customer number can be a default customer number in the event that the user wishes to return the file, such as for a refund, or in the event that the user wishes to renounce ownership. Alternatively, the customer number change request can be responsive to a desire by the user to either give or sell the file to another person in an authorized transaction.

Based on receiving the customer number change request, the central location revises the central database at step 220, and determines the new customer number at step 230. Revising the central database includes removing or erasing associations between the file and the previous customer number, as well as creating associations between the file and the new customer number. The new customer number is embedded in the file at step 240, prior to delivering the file that includes the new customer number to the user. In alternate embodiments, physical possession of the file does not transfer to the central location and the writing processes proceed at workstations remote from the central location.

Figure 3:
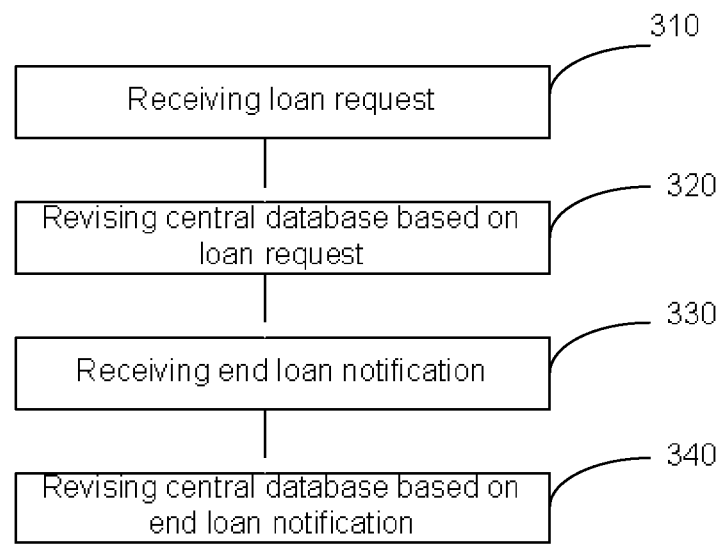
FIG. 3 illustrates another embodiment of a method for digital rights management in accordance with one aspect of the invention.

FIG. 3 illustrates another embodiment of a method 300 for digital rights management in accordance with an aspect of the invention. Method 300 begins at 310 by receiving a loan request. For example, the loan request is received from a user at the central location. A loan request is a request from a user to non-permanently authorize at least one other person to use the file. The loan request, in one embodiment, includes a loan duration. The loan duration can be a fixed period of time, such as one week, or the loan duration can include an end time, such as a calendar date. Additionally, the loan request can include a start date in the event that the user does not desire to immediately loan the file to the lendee, or desires to loan the file at a point in the future.

Based on the received loan request, the central database is revised at step 320. Revising the central database includes associating a new customer number (i.e. the recipient of the loaned file/s) with the file identifier. In embodiments that include a loan term, the loan term is also associated with the customer number.

An end loan notification is received at step 330. The end loan notification can be an automatic notification, such as at the end of the loan term, or the end loan notification can be received from the loaning or receiving user that the term of the loan has ended. Based on the receipt of the end loan notification, the central database is revised at step 340 to show that the loaning user is now the authorized user of the file, and that the receiving user is no longer authorized to possess the file.

Figure 4:
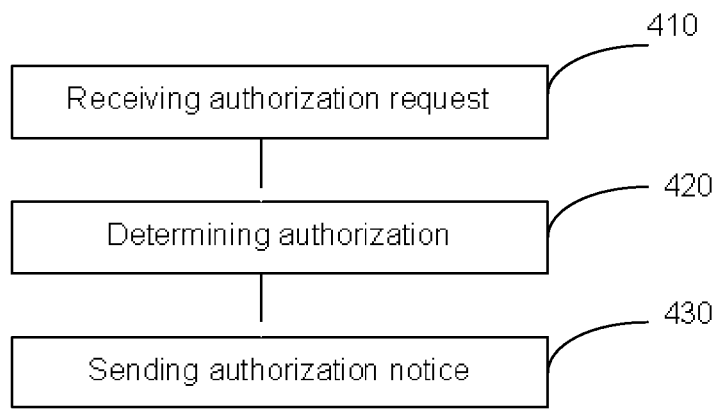
FIG. 4 illustrates another embodiment of a method for digital rights management in accordance with one aspect of the invention.

FIG. 4 illustrates another embodiment of a method 400 for digital rights management in accordance with one aspect of the invention. Method 400 begins at 410 by receiving an authorization request associated with a file. An authorization request is a request to determine the person authorized to possess a file. For example, authorization requests can be received from law enforcement, copyright holders, or other such interested parties. The authorization request can include the file at issue, or the request can include simply the file identifier and user number that have been separated from the file.

Based on receiving the authorization request, the central location determines the authorized user associated with the received customer number at step 420. The determination is based on a database lookup. Based on the lookup, the central location sends an authorization notice responsive to the determined authorization at step 430. The authorization notice can either confirm authorization for a particular user, or send the identity of the user associated with the customer number from the file.

In one embodiment, a user computer will not execute the file without authorization from the central database. In other embodiments, authorization is not required to execute the file. In other embodiments, the authorization includes a time span that is recorded and stored by the user computer such that execution of the file will only be permitted for a period of time responsive to a particular license.

Figure 5:
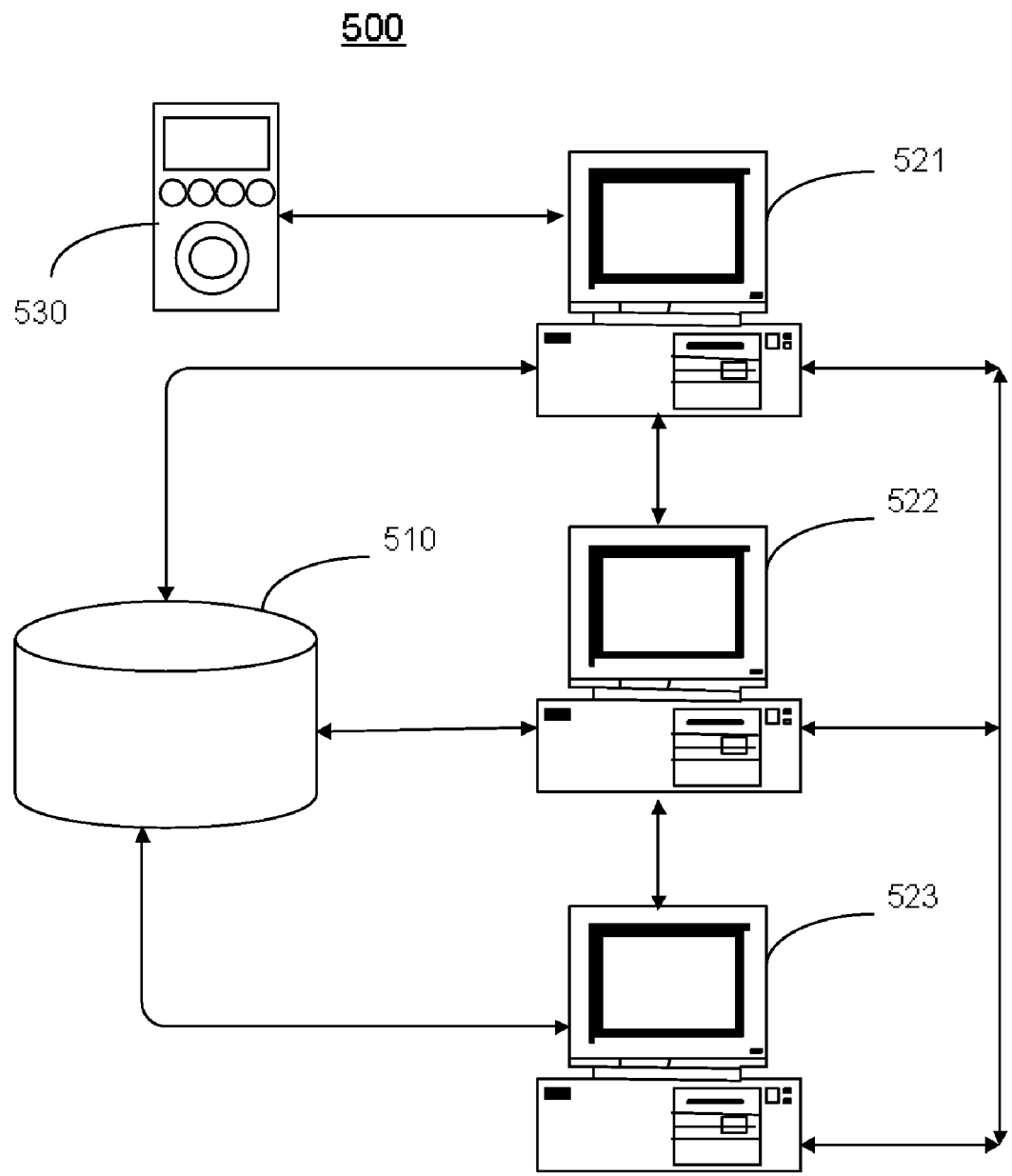
FIG. 5 schematically illustrates a system for digital rights management in accordance with one aspect of the invention.

FIG. 5 illustrates an exemplary system 500 for digital rights management for use with the methods described herein. System 500 includes central location 510 including a database connected to a plurality of user computers 521, 522, 523. User computers 521, 522, 523 connect to central location 510 directly via a network connection, such as the Internet, and user computers 521, 522, 523 also connect to each other either directly or indirectly via network connections, such as the Internet. Personal media player 530 is also illustrated in communication with one of the user computers 521. Files may be transferred between the user computers and the central location, and the central location tracks the user number and file identifier for each file.

For example, assume that a user identifier "521" is associated with the user of user computer 521, that user identifier "522" is associated with the user of user computer 522, and that user identifier "523" is associated with the user of user computer 523. User number 521 becomes an authorized holder of a file F, and central database 510 associates 521 with F. Both user number 521 and file identifier F are embedded into file F. At a later time, user 521 desires to transfer the file to user computer 522 associated with user number 522. Based on this desire, user 521 sends a customer number change request to central database 510, and central database 510 receives the customer number change request. The file is transferred between user computer 521 and user computer 522, and the central database revises the database based on the customer number change request to disassociate 521 from file F, and to associate 522 with file F, and to embed user number 522 in file F.

Preferably, the network connections described herein, and in particular the network connections with the central database are substantially persistent. The network connection can be wired, or the network connection can be based on at least one wireless connection, such as an 802.11 connection. Persistent network connections allow for real time file authorization and authority updates. However, in the event that a network connection is broken, it is preferred that both the central database and any user devices include memory to track any authorization changes that are not sent between devices or otherwise updated.

In one embodiment, the files are not protected from unauthorized copying. In another embodiment, the files include copy protection. In another embodiment, the file identifier can be used to determine the appropriate copyright holder for other purposes, such as for securing additional copyright licenses for alternate purposes. While the authorized user may or may not be responsible for unauthorized copies of their files, any digital copy can be traced back to at least one authorized user.

Additionally, fees can be assessed by the central location based on usage or based on requests. For example, the central location could charge a fee based on purchase of a file, loan of a file, customer number change, or similar.

The database maintained by the central location thus includes several data fields. These fields include file identifiers, user numbers, individuals associated with user numbers, loan flags permitting or forbidding loans, region flags setting any geographical access restrictions, and counters for setting numbers of file executions. Additionally, a database maintained by the digital media player tracks a unique identifier associated with the device, a list of registration numbers for the owner/s of the device, flags indicative of whether the device can be loaned to additional users, and a region flag illustrative of a geographical use restriction for the device. Users can be allowed to edit at least some of the data stored, such as user names and passwords, personal information, current geographical regions, primary and secondary device identifiers for other devices owned or borrowed by the user, primary or secondary copyright material owned or borrowed by the user, historical ownership of files, and loan information.

Figure 6:
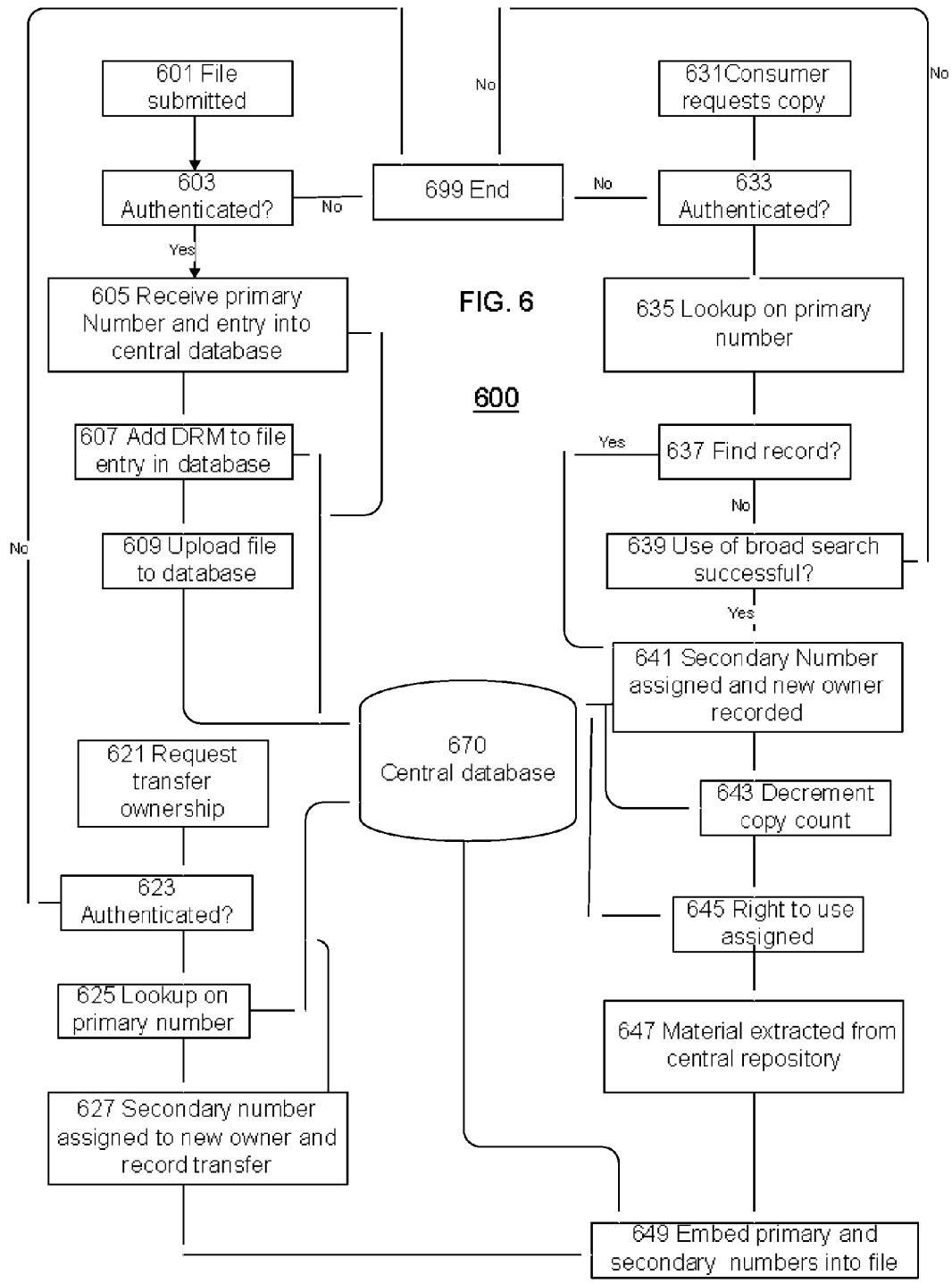
FIG. 6 illustrates another embodiment of a method for digital rights management in accordance with one aspect of the invention.

FIG. 6 illustrates an exemplary systematic flowchart illustrating operations of the DRM methods disclosed, in accordance with one aspect of the invention. At step 601, a file is submitted to the central database 670 by a copyright owner or holder. The file can be submitted via a network connection, or via a medium. At step 603, the file is authenticated by the central database to ensure that the file is safe for submission (virus check, etc.) as well as to ensure that rights to the file are in fact held or owned by the submitter. If the step 603 authentication fails, the method ends at 699.

Based on successful authentication at step 603, the primary number is assigned, sent to the owner, and entered into the central database 670 at step 605 prior to adding the DRM information (such as copy count, loanability, geographic play restrictions and the like) to the entry in central database 670 at step 607 and uploading the file to the central database 670 at step 609.

Alternatively, a transfer ownership request begins at step 621, prior to authentication at step 623. If the step 623 authentication fails, the method ends at 699.

If the step 623 authentication is successful, a lookup is performed on the primary number, and a secondary number is assigned to the new owner and the transfer is recorded in the central database 670 at step 627. The primary and secondary numbers are then embedded in the file at 649.

Alternatively, a copy request is generated at step 631, and authenticated at step 633. If the step 633 authentication fails, the method ends at 699. Successful authentication can be based on DRM rights associated with the file information, a comparison between the requesting owner and registered owner, determination of copy counts allowed, and the like.

If the step 633 authentication is successful, a lookup is performed on the primary number at step 635, and if the record is found at step 637, the secondary number is assigned and the new owner recorded at step 641. Step 641 can include deleting the former owner information from the central database 670 entry. In the event that the record is not found at step 637, a broader search is performed, looking for other information, such as files owned by the consumer and the like. If the broader search successfully locates the file, the method proceeds to step 641, while if not the method ends at 699.

Based on recording the new ownership information, the copy count is decremented at step 643, and the right to use the file assigned to the new customer at step 645. Assigning the right to use the file can include updating the central database 670. The file is then extracted from the central repository or central database at step 647, and the primary and secondary numbers are embedded in the file at step 649.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A method for performing digital rights management functions, the method comprising the steps of:
 a computer receiving a selection input from a user;
 the computer associating a customer number with a file based on the selection input;
 the computer embedding the customer number and a file identifier associated with the file in the file, wherein the file identifier and customer number are associated in a database;
 the computer sending the file with the embedded customer number and file identifier to the user;
 the computer receiving a customer number change request;
 the computer determining a new customer number responsive to the customer number change request;
 the computer receiving an authorization request associated with a file, wherein the authorization request comprises the customer number and the file identifier, and wherein the customer number is a unique identifier associated with the user; and
 the computer sending an authorization notice.

2. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

3. A method for digital rights management, the method comprising the steps of:
 a computer receiving a selection input from a user;
 the computer associating a customer number with a file based on the selection input;
 the computer embedding the customer number and a file identifier associated with the file in the file, wherein the file identifier and customer number are associated in a central database;
 the computer sending the file with the embedded customer number and file identifier to the user;
 the computer receiving a customer number change request;
 the computer determining a new customer number responsive to the customer number change request; and
 the computer embedding the determined new customer number in the file.

4. The method of claim 3, further comprising the step of the computer receiving a loan request associated with the sent file, wherein the loan request includes a loan start date and a loan term associated with at least one file.

5. The method of claim 3, wherein the customer number and file identifier are encrypted.

6. The method of claim 3, further comprising the step of the computer assigning the file identifier to the file before the step of the computer associating the customer number with the file based on the selection input and concurrently with a sale or transfer.

7. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 3.

8. A method for digital rights management, the method comprising the steps of:
 a computer receiving a selection input from a user;
 the computer associating a customer number with a file based on the selection input;
 the computer embedding the customer number and a file identifier associated with the file in the file, wherein the file identifier and customer number are associated together;
 the computer sending the file with the embedded customer number and file identifier to the user;
 the computer receiving a customer number change request;
 the computer determining a new customer number responsive to the customer number change request;
 the computer receiving an authorization request associated with a file, wherein the authorization request comprises the customer number and the file identifier;
 the computer determining an authorization based on a database and authorization request; and
 the computer sending an authorization notice in response to the determined authorization.

9. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 8.

* * * * *